(12) United States Patent
Oku et al.

(10) Patent No.: US 7,144,541 B2
(45) Date of Patent: Dec. 5, 2006

(54) METHOD FOR FABRICATING MOLDED RESINOUS PART WITH METAL DISTRIBUTED IN SURFACE THEREOF

(75) Inventors: Toshiaki Oku, Izumi (JP); Hiroyuki Suga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 169 days.

(21) Appl. No.: 10/335,929

(22) Filed: Jan. 3, 2003

(65) Prior Publication Data
US 2003/0183987 A1 Oct. 2, 2003

(30) Foreign Application Priority Data
Mar. 29, 2002 (JP) .............................. 2002-095526

(51) Int. Cl.
B29C 45/46 (2006.01)
B29B 7/00 (2006.01)
(52) U.S. Cl. ............... 264/328.18; 264/310; 264/328.1
(58) Field of Classification Search ............. 264/328.1, 264/328.18, 310
See application file for complete search history.

(56) References Cited

U.S. PATENT DOCUMENTS 3,867,315 A * 2/1975 Tigner et al. ............... 252/512
4,440,893 A * 4/1984 Kallenback et al. ........ 524/305
5,095,048 A * 3/1992 Takahashi et al. .......... 523/223
5,239,041 A * 8/1993 Grigsby et al. ............... 528/60
5,543,092 A * 8/1996 Ibar .......................... 264/40.1
5,820,808 A * 10/1998 van Oene et al. ....... 264/328.12
6,589,459 B1 * 7/2003 Nakagawa et al. ......... 264/104

FOREIGN PATENT DOCUMENTS

JP HEI 3-158216 7/1991

OTHER PUBLICATIONS

CRC Handbook of Chemistry and Physics, 84th edition, Table: "Melting, Boiling, Triple, and Critical Point Temperature of the Elements".*
Rosato, Dominick V., Donald V. Rosato, and Marlene G. Rosato. Injection Molding Handbook (3rd edition). Boston: Kluwer Academic Publishers, 2000. p. 538, Table 6-22.*

* cited by examiner

Primary Examiner—Christina Johnson
Assistant Examiner—Monica A Huson
(74) Attorney, Agent, or Firm—Nixon & Vanderhye P.C.

(57) ABSTRACT

A method for fabricating a molded resinous part with a metal distributed in a surface thereof comprising: kneading a low-melting metal and a resin having a curing temperature lower than a solidification point of the low-melting metal in a molten state; and injection-molding the resulting kneaded mixture into a mold whose temperature is set to a temperature equal to or lower than the solidification point of the low-melting metal and higher than the curing temperature of the resin, thereby obtaining a molded resinous part comprising the resin as a core and the low-melting metal in a surface thereof.

11 Claims, 2 Drawing Sheets

METHOD FOR FABRICATING MOLDED RESINOUS PART WITH METAL DISTRIBUTED IN SURFACE THEREOF

CROSS-REFERENCE TO RELATED APPLICATION

This application is related to Japanese Patent Application No. 2002-095526 filed on Mar. 29, 2002, whose priority is claimed under 35 USC § 119, the disclosure of which is incorporated by reference in its entirety.

BACKGROUND OF THE INVENTION

1. Field of the Invention

The present invention relates to a method for fabricating a molded resinous part with metal distributed in a surface thereof, more particularly, a method for fabricating an electroconductive molded resinous part with metal distributed in a surface thereof.

2. Description of Related Art

In the filed of electronic equipment with semiconductor elements mounted thereon, for the purpose of preventing mal-operation caused by electromagnetic waves and static electricity, resin-encapsulated semiconductor devices and resin-packaged or resin-housed electronic devices have been conventionally used. For such capsules, packages and housings, used are conductive resins made of resins kneaded with conductive powders, resinous parts molded in one piece with conductive coating, molded resinous parts provided with nonelectrolytic plating and the like.

However, in the case where a resin is kneaded with a conductive powder and a molded conductive resinous part is formed therefrom with use of a mold, a stable conductivity cannot be obtained because the conductive powder is dispersed in the resin, as shown in FIG. 3. Also, in order to attain a desired performance, a large amount of the conductive powder is requred. Consequently, the physical strength of the molded part is declined, the weight thereof is increased, and the production costs thereof is raised disadvantageously.

In the case where the molded resinous part is formed in one piece with the conductive film, the adhesion between the conductive film and the molded resinous part is not sufficient, and therefore, it is difficult to produce a molded resinous part having a stable conductivity.

In the case of nonelectrolytic plating is provided, a resin easy to plate is primarily molded, then a material hard to plate is injected into part of the molded product which part is not to be plated and the obtained product is secondarily formed. Or alternatively, part of the primarily molded product which part is to be plated is subjected to a surface activation treatment and then is nonelectrolytically plated. Thus the nonelectrolytic plating requires complicated processes, which increases production costs.

SUMMARY OF THE INVENTION

In view of the above-mentioned circumstances, an object of the present invention is to provide an easy method for fabricating a molded resinous part, the method being capable of giving the part electroconductivity safely and efficiently.

The present invention provides a method for fabricating a molded resinous part with a metal distributed in a surface thereof comprising: kneading a low-melting metal and a resin having a curing temperature lower than a solidification point of the low-melting metal in a molten state; and injection-molding the resulting kneaded mixture into a mold whose temperature is set to a temperature equal to or lower than the solidification point of the low-melting metal and higher than the curing temperature of the resin, thereby obtaining a molded resinous part comprising the resin as a core and the low-melting metal in a surface thereof.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
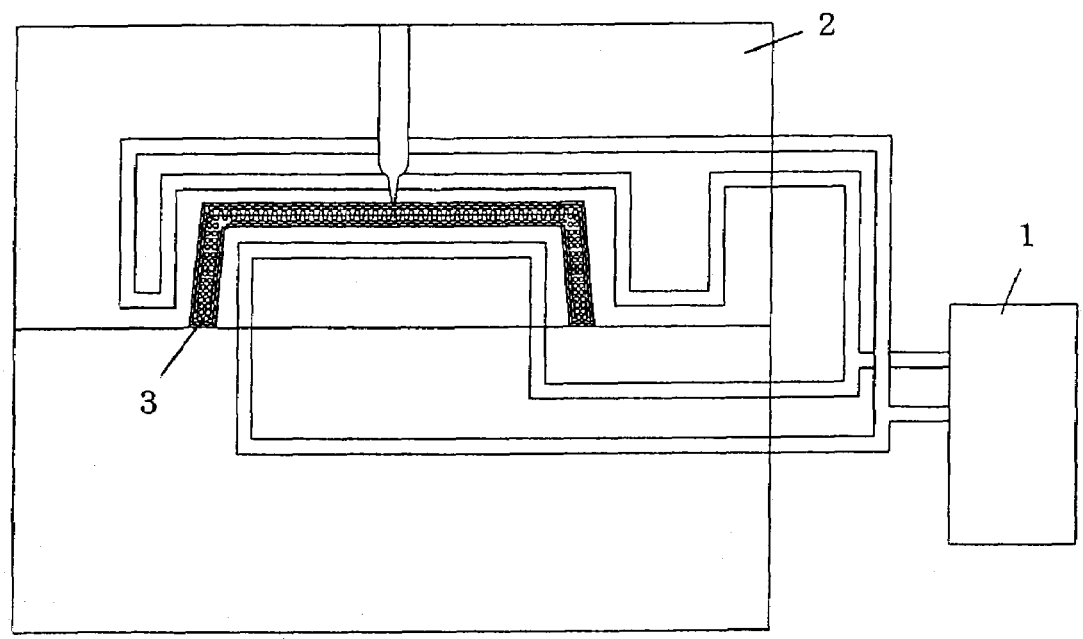
FIG. 1 is a schematic sectional view of a major part illustrating an example of a method for fabricating a molded resinous part in accordance with the present invention.

The present invention is a method for fabricating a molded resinous part which comprises a core of a resin and a metal distributed (like coating) in a surface layer of the molded resinous part.

The resin usable according to the present invention is not particularly limited to any kind, provided that it is usually used for packaging or housing semiconductor devices or electronic devices. However, the resin is required to have a curing temperature lower than a solidification point of a low-melting metal described later. Preferably, the resin is also a resin having a small mold shrinkage factor and/or thermoplastic resin. Examples of such resins include polyester, polyethylene, polypropylene, polystyrene, polyvinyl chloride, epoxy resin, polyamide, polyacetal, polycarbonate, modified polyphenylene ether, polyarylate, polyether imide, polyamide imide, polyphenylene sulfide, mesomorphism polyester, butylal resin, petroleum resin, ABS resin and the like. These may be used singly or as a mixture of two or more thereof. To these resins, additives may be added such as an anti-sag agent, a curing accelerator, an anti-oxidant, a pigment, a filler, reinforced fibers, a thickener, a foaming agent, a release agent and the like.

The low-melting metal is not particularly limited provided that it can give the resin the conductivity, for example, by being kneaded with the resin. The low-melting metal has a solidification point of, for example, about 150° C. or less, preferably, about 130° C. or less, about 100° C. or less. In the case where the metal is pure, since the solidification point usually agrees with the melting point, the solidification point and the melting point need not be distinguished in the present invention. Examples of such low-melting metals include tin, indium, potassium, bismuth and their alloys, which may be used singly or as a mixture of two or more thereof. The low-melting metal is preferably used in a particulate form. For example, powder of about 0.1 to 10 μm in average particle size may typically be mentioned.

The kneaded mixture of the resin and the metal may contain the metal in a sufficient amount such that the metal is distributed in a surface layer of the molded resinous part. In other words, the kneading ratio of the resin to the low-melting metal may be selected as appropriate according to a desired conductivity to be given to the package or the like, but for example, may be about 8:2 to 7:3 by weight.

The resin and the low-melting metal are required to be kneaded while both are in a molten state. The kneading temperature may be adjusted as appropriate depending upon the types of the resin and low-melting metal used and the like. For kneading, may be used ordinary kneaders such as a single-screw extruder, a double-screw extruder, a roll mill, a Banbury mixer, a Brabender mixer, a line mixer, a pressure kneader and a router. The kneaders may be of a closed type or of an open type. The kneading temperature means a temperature at which components to be kneaded are melted, and may usually be about 200 to 250° C., preferably about 200 to 220° C. The kneading time may usually be about 3 to 60 minutes if the pressure kneader, the Banbury mixer or the like is used as a kneader.

The mold (die) may be of any type so long as it is used for plastic molding, but it is preferably formed of a material capable of being set to a temperature equal to or lower than the solidification point of the low-melting metal used and equal to or higher than the curing temperature of the resin. For example, the mold is formed of iron, stainless steel or the like to have a desired cavity. Further, the mold is preferably provided inside thereof, preferably around the cavity, with a heating mechanism for maintaining a uniform temperature over the whole cavity.

The resin with the low-melting metal kneaded therewith may be injected into the mold by methods known in the field of art, including a so-called reaction and liquid injection molding method.

Preferably, in the present invention, the resin with the low-melting metal kneaded therewith may be injected into the mold with oscillating the mold. This oscillation is preferably such that the low-melting metal contained in the resin can be vibrated sympathetically with the mold, preferably in width, length and height directions, i.e., three-dimensionally. The oscillation may also be given by rotation. For example, the oscillation may be given by about 10 to 200 times per minute of movement of about 10 to 15 mm in the width, length and/or height directions, or by about 10 to 200 times per minute of movement in order of length, width and height directions, or by rotation of the mold itself at 10 to 500 rpm in a two-dimensional direction, or by rotation of the mold itself simultaneous with oscillation in the height direction as described above.

Further, the resin with the low-melting metal kneaded therewith may be circulated one end to another end of the mold for an appropriate time. In this case, the mold is provided with one or more outlets capable of discharging the injected resin in addition to an injection port. The outlets are preferably formed on diagonal lines of the mold or to have the longest distance therebetween. The time of circulating the kneaded product may be selected as appropriate depending upon the size and shape of the mold, the type and the fluidity of the resin and the like. For example, the circulation time may be about 5 to 10 seconds, preferably about 5 to 7 seconds after the mold is completely filled with the resin if the mold has a cavity of about 24500 to 28000 cm$^3$ volume and the injection rate is about 40 to 50 mm per second.

In the method for fabricating the molded resinous part of the present invention, the mold is thereafter cooled to cure the resin and the low-melting metal. This cooling may be natural cooling or forced cooling by controlling a temperature decreasing rate. In this cooling (solidifying, curing) process, only the low-melting metal is first solidified with the resin still remaining in the molten state. During this process, since the temperature of the inside of the mold is higher than that on the surface of the mold, a thin film of the low-melting metal is formed on the surface of the molded part. In the case where the resin is circulated, the thin film of the low-melting metal formed on the surface of the molded part can be thicker since the temperature is higher in the center of the circulated resin than in the outside (the mold side).

The present invention is now described in further detail with reference to examples of the method for fabricating the molded resinous part.

EXAMPLE 1

First, 100 parts by weight of ABS resin, 30 parts by weight of particulate bismuth and tin as a low-melting alloy and optionally metal powder (e.g., copper powder, etc.) as a dispersing agent are kneaded at about 250° C. At this time, the curing temperature of the resin and the solidification point of the low-melting alloy are 95° C. and 138.5° C., respectively, and therefore, the resin and the low-melting alloy are both in the molten state.

The resulting kneaded product is injected into a mold 2 as shown in FIG. 1 which has a cavity and whose inner surface temperature is set to 100° C. by a temperature adjuster 1 capable of keeping constant the inner surface temperature, and then is allowed to cool at room temperature to from a molded part 3. During cooling, the resin remains melted because the kneaded product injected in the cavity is hot at the inside, while the low-melting alloy gradually solidifies at the outside of the kneaded product owing to the temperature of the inner surface of the mold, thereby to form a thin film of the low-melting alloy. In that state, as the temperature of the mold gradually decreases, the resin inside cures. Thereby, a molded part is produced which has conductivity attributed to the thin film of the low-melting metal.

EXAMPLE 2

Figure 2:
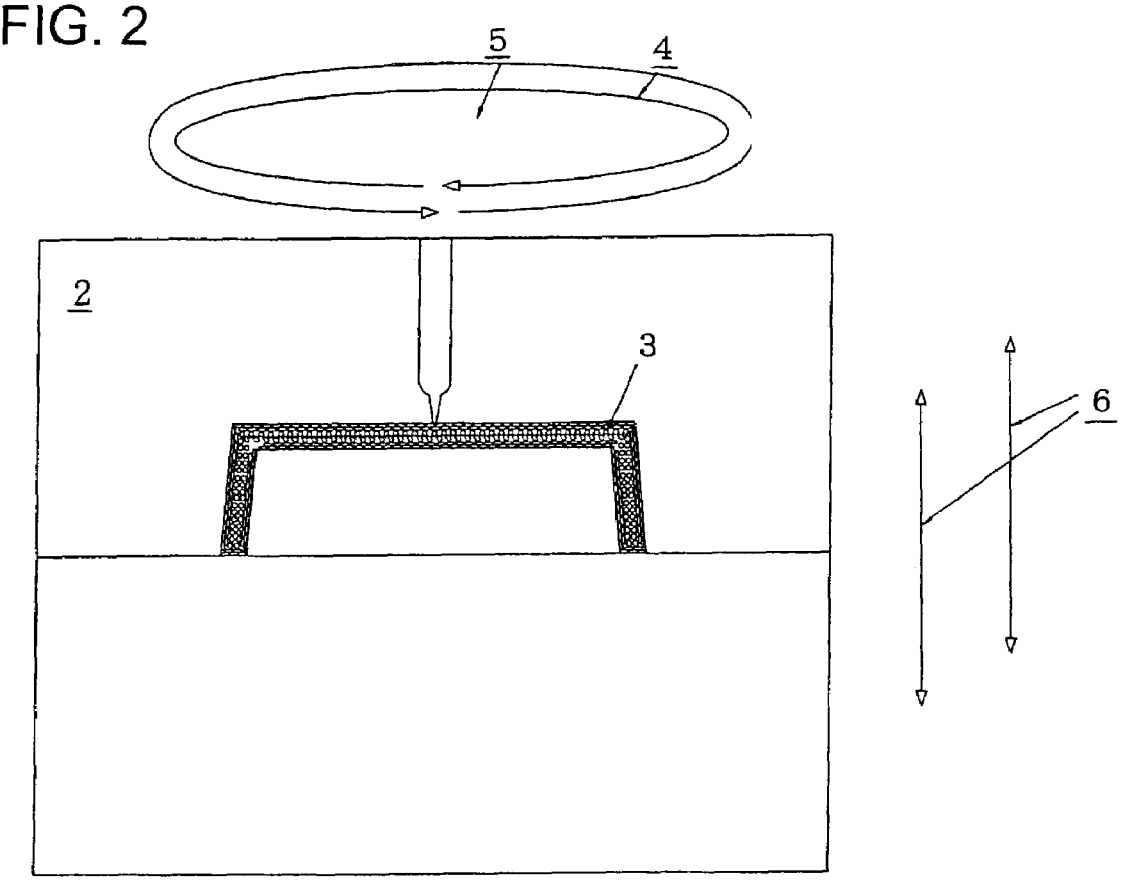
FIG. 2 is a schematic sectional view of a major part illustrating another example of a method for fabricating a molded resinous part in accordance with the present invention.

The kneaded product obtained in Example 1 is injected into a mold 2 (having an inner surface temperature of 100° C.) as shown in FIG. 2, and is allowed to cool at room temperature. When the kneaded product is injected, the mold 2 is rotated in the direction of an arrow 4 or 5 at about 60 rpm and is simultaneously oscillated in the direction of an arrow 6. This oscillation is performed by movement of about 10 mm at 120 times per minute. Furthermore, by continuing the oscillation during cooling after injection, a molded part is produced which has a thin film of the low-melting alloy at the outside thereof and has conductivity.

EXAMPLE 3

Figure 3:
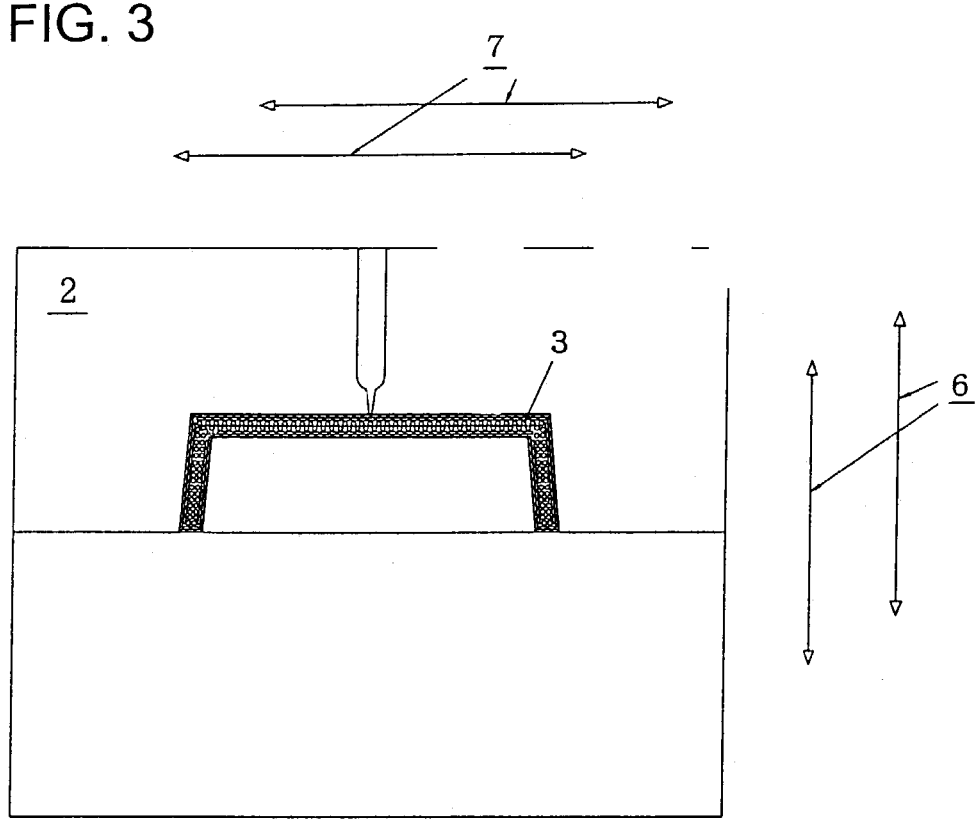
FIG. 3 is a schematic sectional view of a major part illustrating still another example of a method for fabricating a molded resinous part in accordance with the present invention.

The kneaded product obtained in Example 1 is injected into a mold 2 (having an inner surface temperature of 100° C.) as shown in FIG. 3, and is allowed to cool at room temperature. When the kneaded product is injected, the mold 2 is oscillated in the directions of arrows 7 and 6. This oscillation is performed by movement of about 10 mm at 120 times per minute. Furthermore, by continuing the oscillation during cooling after injection, a molded part is produced which has a thin film of the low-melting alloy at the outside thereof and has conductivity.

EXAMPLE 4

Figure 4:
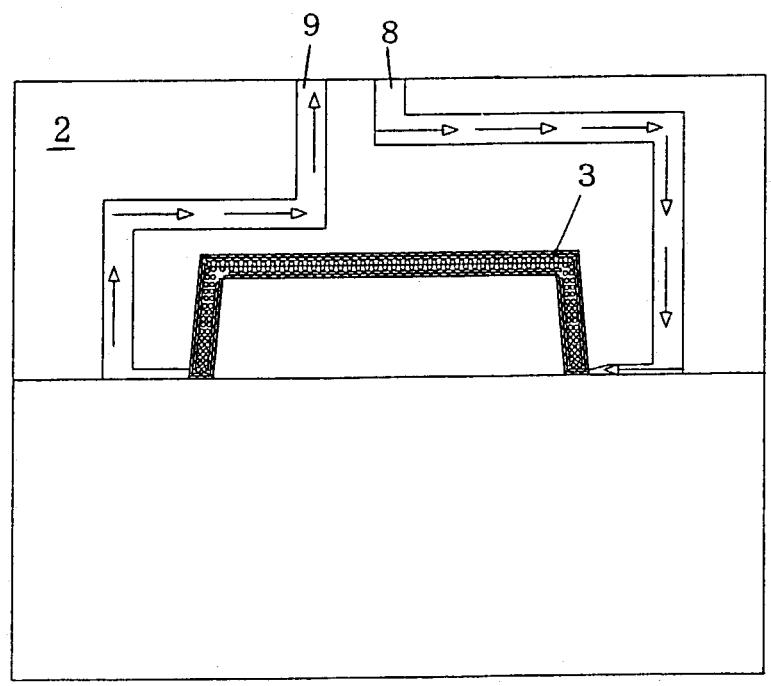
FIG. 4 is a schematic sectional view of a major part illustrating still another example of a method for fabricating a molded resinous part in accordance with the present invention.

The kneaded product obtained in Example 1 is injected into a mold 2 (having an inner surface temperature of 100° C.) as shown in FIG. 4. The injection rate is about 40 mm/second. After the cavity of the mold 2 is completely filled with the kneaded product, the kneaded product is circulated in the cavity for about five seconds through an injection port 8 and an outlet 9. Thereafter circulation is finished. During the above process, the mold 2 is maintained at 100° C. until the complete filling with the kneaded product and then starts to be allowed to cool at room temperature immediately after the completion of the filling. Thereby a molded part is produced which has a thin film of the low-melting metal at the outside thereof and has conductivity.

The molded parts obtained in the above-described examples exhibits better conductivity than prior-art parts.

According to the present invention, the thin film of the low-melting metal can be efficiently formed on the surface of the molded part by setting the temperature of the mold properly at injection molding. Thus the molded part having a conductive surface can be easily produced and the production cost thereof can be reduced.

Further by oscillating the kneaded product of the resin and the low-melting metal or circulating the kneaded product at injection, the low-melting metal can be deposited more securely on the outside surface of the molded product. Thus, since the low-melting metal can form a thicker film, the conductivity is advantageously given to the molded part.

What is claimed is:

1. A method for fabricating a molded resinous part with a metal distributed in a surface thereof comprising:
    kneading a low-melting-temperature metal and a resin having a curing temperature lower than a solidification point of the low-melting-temperature metal in a molten state to form a kneaded mixture; and
    injection-molding the resulting kneaded mixture into a mold whose temperature is set to a temperature equal to or lower than the solidification point of the low-melting-temperature metal and higher than the curing temperature of the resin, thereby obtaining a molded resinous part comprising the resin as a core and the low-melting-temperature metal as a thin conductive film of metal on an exterior surface of the core.

2. The method according to claim 1, wherein the kneaded mixture is injected into the mold while oscillating the mold.

3. The method according to claim 1, wherein the kneaded mixture is circulated from one end to another end of the mold for an appropriate time.

4. The method according to claim 1, wherein the resin is one or more selected from the group consisting of polyester, polyethylene, polypropylene, polystyrene, polyvinyl chloride, epoxy resin, polyamide, polyacetal, polycarbonate, modified polyphenylene ether, polyarylate, polyether imide, polyamide imide, polyphenylene sulfide, mesomorphism polyester, butylal resin, ABS resin and petroleum resin and the low-melting-temperature metal is one or more selected from the group consisting of tin, indium, potassium and bismuth, and their alloys.

5. The method according to claim 1, wherein the low-melting-temperature metal is in a particulate form and has about 0.1 to 10 μm in average particle size.

6. The method according to claim 1, wherein the kneading ratio of the resin to the low-melting metal is 8:2 to 7:3 by weight.

7. The method according to claim 1, wherein the kneading temperature is 200 to 250° C.

8. The method according to claim 2, wherein the oscillation is given by 10 to 200 times per minute of movement in the width, length and/or height directions.

9. The method according to claim 2, wherein the oscillation is given by rotation of the mold itself at 10 to 500 rotations per minute in a two-dimensional direction.

10. The method of claim 1, where the kneaded mixture includes more resin than metal by weight.

11. A method for fabricating a molded resinous part with a metal distributed in a surface thereof, the method comprising:
    kneading a low-melting metal and a resin having a curing temperature lower than a solidification point of the low-melting metal in a molten state;
    injection-molding the resulting kneaded mixture into a mold whose temperature is set to a temperature equal to or lower than the solidification point of the low-melting metal and higher than the curing temperature of the resin; and
    cooling the kneaded mixture to a temperature lower than the curing temperature through the mold to solidify the mixture, thereby obtaining a molded resinous part comprising the resin as a core and thin conductive film of the low-melting metal on an exterior surface of the core.

* * * * *